July 23, 1968        J. S. ZIMMER        3,394,325

FOUR POLE MICROMINIATURE RELAY

Original Filed Aug. 11, 1965        2 Sheets-Sheet 1

INVENTOR.
JOHN S. ZIMMER
BY *W. J. Shanley, Jr.*
HIS ATTORNEY

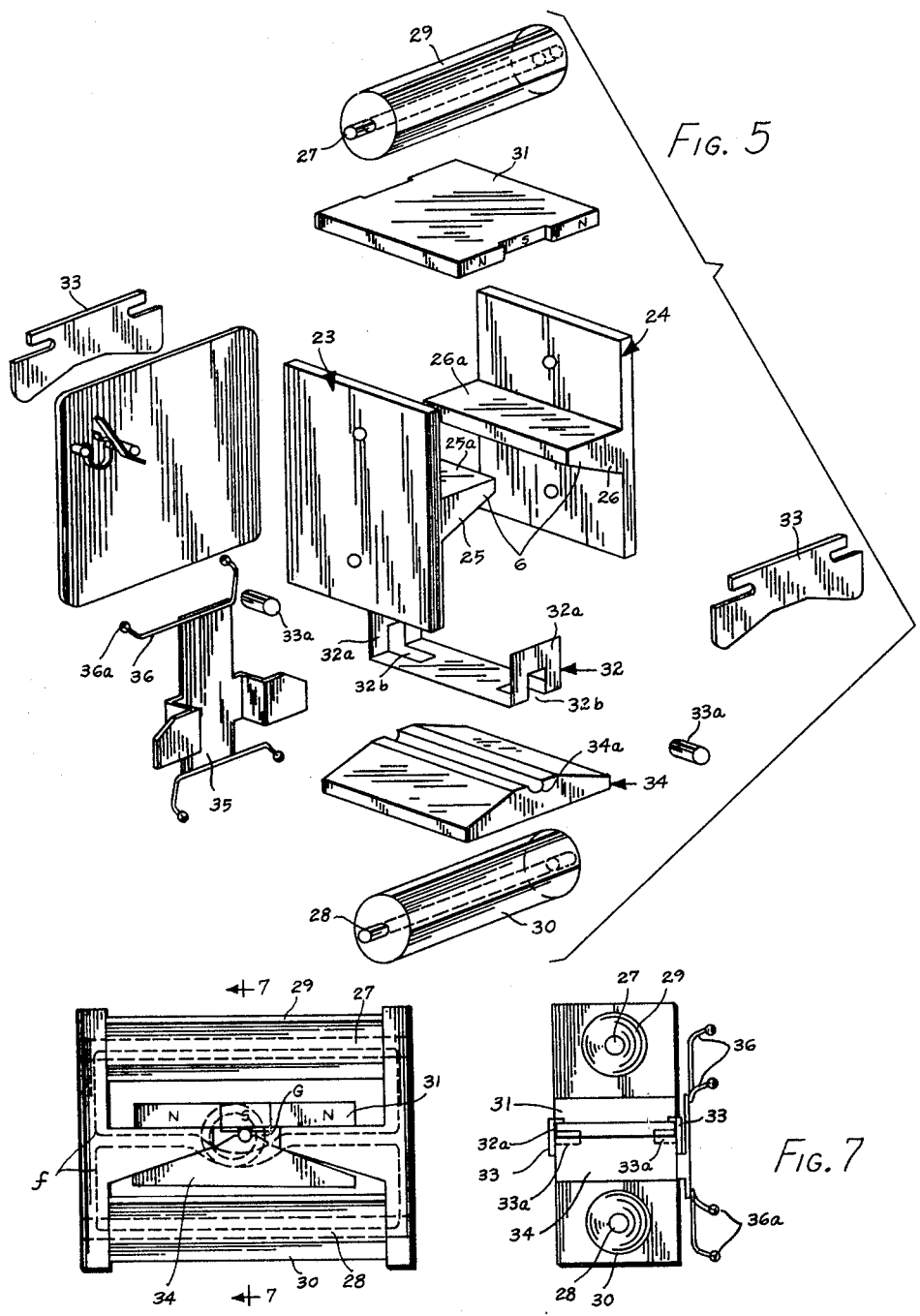

United States Patent Office 3,394,325
Patented July 23, 1968

3,394,325
FOUR POLE MICROMINIATURE RELAY
John S. Zimmer, Waynesboro, Va., assignor to General Electric Company, a corporation of New York
Continuation of application Ser. No. 603,044, Dec. 19, 1966, which is a continuation of application Ser. No. 478,883, Aug. 11, 1965. This application June 7, 1967, Ser. No. 655,972
4 Claims. (Cl. 335—81)

ABSTRACT OF THE DISCLOSURE

A miniature relay having two coils in parallel magnetic circuit to reduce overall size and particularly package height. The coils are electrically connected in series but produce parallel flux paths which are joined by the pole pieces to provide combined flux flow through the armature.

---

This application is a continuation of my co-pending application S.N. 603,044 filed Dec. 19, 1966, which in turn is a continuation of my original application S.N. 478,883 filed Aug. 11, 1965.

This invention relates to a relay and, in particular, a relay using a rotatable armature capable of operating a number of controls.

In complex and compact electronic apparatus, it is important that maximum operation be achieved from a minimum amount of space. In the past, relay apparatus have presented a serious problem in limiting the size to which the electronic apparatus can be reduced. Further, the conventional relay, which projects generally above other components such as transistors mounted on a board, is more susceptible to vibration which may produce malfunction thereof.

An object of this invention is to provide an electromagnetic relay of microminature size for performing a variety of switching operations.

Another object of this invention is to provide a relay which is comparable in size to transistors and other relatively small electronic components.

A still further object is to disclose a relay construction which enables reduction of the height of the relay above a circuit board for reducing the effects of vibration on the relay.

According to this invention in one embodiment thereof, a relay is provided having a pair of parallel end plates supported above a header. A pair of coil wound cores extend between the end plates on opposite sides of a pivotable armature mounted therebetween. The coils are electrically connected in series and the flux paths produced thereby are in parallel before beinng joined in a pole piece to form a combined flow through the armature. The armature pivots an actuator plate for actuating a plurality of movable contacts between adjacent pairs of stationary contacts.

In another aspect of this invention it is contemplated that the coils could be connected to independent sources of electrical signals. With such an arrangement where both coils must be energized to activate the relay it is possible to provide an "and" circuit. With this arrangement if only one coil is energized the flux induced is shorted out by the core of the adjacent coil so that there is no flux through the armature gap. When both coils are energized, the flux from both cores is additive and will pass through the armature gap activating the relay.

These and other objects and advantages will become more apparent when considering the following specification and claims with reference to the following drawings of which:

FIG. 5 is an exploded, perspective view of a second embodiment of this invention;

FIG. 6 is a sectional elevation view of the relay emobdiment of FIG. 5; and

FIG. 7 is a sectional view of the relay embodiment of FIG. 5.

Figure 1:
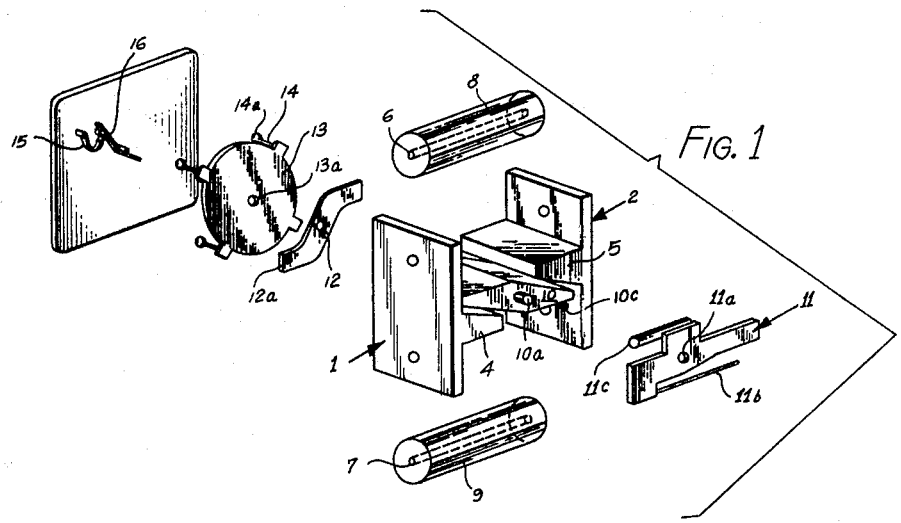
FIG. 1 is an exploded, perspective view of one embodiment of this invention.
Figure 2:
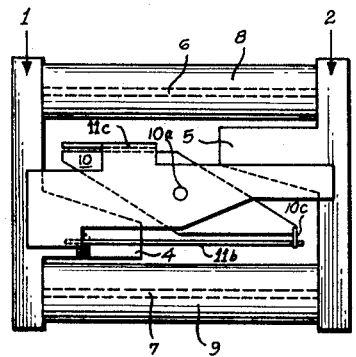
FIG. 2 is an elevation view of the embodiment of FIG. 1.

Referring to FIG. 1, the relay is comprised of a pair of end plates 1 and 2 of magnetic material which are secured to a header 3. The end plates 1 and 2 are oriented substantially parallel to each other. Each of the end plates has a centrally disposed, mutually facing pole piece 4 and 5, respectively. Extending between the end plates 1 and 2 on opposite sides of the pole pieces 4 and 5 are a pair of core members 6 and 7. Each core member 6 and 7 is connected to the end plates 1 and 2. A pair of coils 8 and 9 surround the cores 6 and 7, respectively, for inducing magnetic flux through the cores and into the end plates.

As illustrated in the embodiment of FIGS. 1-4, an armature 10 is rotatably disposed between the pole pieces 4 and 5 by a pair of bearing members 11 and 12 of nonmagnetic material. The bearing members 11 and 12 are secured to end plates 1 and 2 and have apertures 11a and 12a for receiving studs or journal members 10a and 10b, respectively, which project from the armature 10 as illustrated more clearly in FIG. 3. The rotatable armature is secured to a switch actuator means 13 through the journal member 10b, which will be more fully described hereinafter.

A spring member 11b is provided for normally biasing the armature 10 out of engagement with the pole pieces 4 and 5. One end of the spring 11b is secured to the bearing member 11 by spot welding or by similar joining means. The free end of the spring member 11b is received within a harness portion 10c on the armature 10. The relationship of the spring member 11b, the bearing 11, the armature harness 10c and the armature 10 can be better appreciated by reference to FIG. 2. The spring 11b biases the armature 10 into clockwise rotation. For retarding clockwise rotation of the armature, a stop member 11c projects inwardly from the bearing portion 11 and over the top of the armature 10. The stop portion 11c is positioned to limit the counterclockwise rotation of the armature 10 after the spring 11b has biased the armature out of engagement with the pole pieces 4 and 5.

Figure 3:
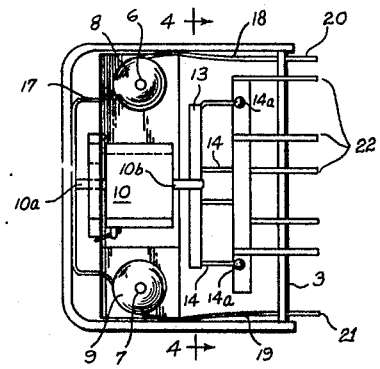
FIG. 3 is a sectional side view of FIG. 1.

Referring to FIG. 3, the rear stud or journal portion 10b of the armature 10 extends through the aperture 12a of the bearing member 12 and is fixedly secured to the actuator plate 13 by spot weld or shrink fit within an aperture 13a in the actuator plate 13. The actuator plate has a plurality of actuator members 14 spot welded or similarly joined to the actuator plate 13 to project axially toward the header 3. The free end of each actuator member 14 has an enlarged, bulbous portion 14a formed by a glass bead or similar electrically insulative material.

Figure 4:
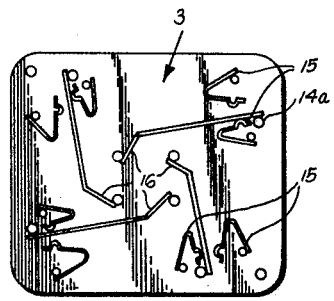
FIG. 4 is a sectional view along lines 4—4 of FIG. 3.

Referring to FIG. 4, the header 3 has a plurality of stationary contact members 15 mounted thereon, and a plurality of movable contact members 16. Each of the movable contact members 16 extends between a pair of stationary contacts 15, the movable contact members 16 being biased, by natural spring forces therein, into engagement with one of the adjacent pair of stationary contact members. The glass bead portion 14a of each actuator member 14 is positioned adjacent one of the movable contact members 16 so that upon rotation of the actuator plate 13, the glass bead portions 14a force the movable contact members 16 out of engagement with one of the adjacent pair of stationary contacts 15 and into engagement with the other of the adjacent pair of stationary contacts.

The coils 8 and 9 are connected in series by a conducting member 17, as illustrated in FIG. 3, and are arranged for engagement with an electrical energy source by a pair of electrical conductors 18 and 19 which are connected to the coil windings and are also attached to connecting leads 20 and 21, respectively, which pass through the header 3 and are electrically insulated therefrom. Similar leads 22 through the header 3 are connected to and support each of the stationary contacts 15 and the movable contact 16 mounted on the inner side of the header 3 for enabling electrical connection into outside circuits.

Thus, it may be appreciated, by reference to the first embodiment shown in FIGS. 1–4, that a single rotating actuator plate 13 having a plurality of actuator members 14 disposed thereon operates to actuate a plurality of single throw, double pole switches in response to electromagnetic flux induced into the cores 6 and 7, the end plates 1 and 2, and the armature 10. The rotary motion is induced by the flux which rotatably draws the armature 10 into engagement with the pole pieces 4 and 5. Upon deenergizing of the coils 8 and 9, flux no longer attracts the armature and, hence, the spring member 11b rotates the armature out of engagement with the pole pieces 4 and 5.

In a second embodiment of this invention, as illustrated in FIGS. 5–7, the plurality of switches may be maintained in either of two positions after deenergization of the coils. Structurally, the relay is comprised of a pair of end plates 23 and 24 of magnetic material which are likewise secured to a header 37. The end plates 23 and 24 are oriented substantially parallel and each has centrally disposed, mutually facing pole pieces 25 and 26, respectively. Extending between the end plates 23 and 24 on opposite sides of the pole pieces 25 and 26 are a pair of core members 27 and 28, each core having a coil 29 and 30, respectively, wound thereabout for inducing magnetic flux through the cores and into the end plates.

The upper surfaces of the pole pieces 25 and 26 have mutually planar surfaces 25a and 26a, respectively, for supporting a three pole permanent magnet 31. A U-shaped pin retainer member 32 of magnetic material is positioned within a gap G between the ends of the pole pieces 25 and 26 and is secured thereto. A pair of legs 32a on the U-shaped pin retainer 32 are fastened to the retainer plates 33. The center portion of the magnet has a first polarity S, while the ends of the magnet have an opposite polarity N. The two corners of the U-shaped pin retainer have slots 32b therein for receiving pins 33a. The retainer plates 33 are secured to the sides of the end plates 23 and 24.

An armature 34, formed of magnetically attractive material, is disposed on the lower side of the pole pieces 25 and 26, as illustrated in FIG. 6. The top center portion of the armature 34 has a semicircular groove 34a which engages the pins 33a for providing a bearing about which the armature 34 may rotate. The armature, which is constructed of relatively lightweight material, is maintained in engagement with the pins 33a regardless of the orientation of the relay by the relatively strong magnetic force $f$ as illustrated by the dotted lines in FIG. 6. The circuit for the magnetic lines of force $f$ is completed through one of the pole pieces 25 or 26, through the armature 34, through the pins 33a and back to the magnet through the U-shaped pin retainer 32. The armature 34 is maintained in one of two positions, namely, in engagement with the pole piece 25 as illustrated in FIG. 6, or in engagement with the pole piece 26.

The armature is actuated between one of the two above-mentioned positions in response to the polarization of the magnetic flux induced by the coils 29 and 30. If the coils are energized to aid the left-hand portion of the permanent magnet and oppose the right-hand portion, the armature would stay in a position as illustrated in FIG. 6. However, if the coils were energized in reverse to oppose the left-hand portion of the magnet and to aid the right-hand portion, the armature would be drawn in a counter-clockwise rotation into engagement with the pole piece 26.

Rotation of the armature 34 is transmitted to an actuator plate 35 which is welded or similarly secured to one end of the armature 34. The actuator plate 35 has a plurality of actuator members 36 extending therefrom, as illustrated in FIGS. 5 and 7. Each of the actuator members 36 has a similar bulbous portion in the form of a glass bead 36a or similar dielectric material on the tip thereof for actuating switches in a manner as recited above and disclosed in FIGS. 3 and 4.

Thus it can be appreciated that the embodiment of FIGS. 1–4 enables the switches to be maintained in a normal position because of the biasing spring, and to be actuated to an operated position in response to the coil being energized. The armature and magnet arrangement in the embodiment of FIGS. 5–7 enables the armature to be actuated to one of two positions in response to the polarization of the coil of magnetic flux, and to be held in that position by the permanent magnet after the coils are deenergized.

As is evident from the foregoing description, this invention is not limited to the particular construction details of the examples illustrated, and I contemplate that various and other modifications and applications will occur to those skilled in the art. It is, therefore, my intention that the appended claims shall encompass such modifications and applications which do not depart from the true spirit and scope of my invention.

What is claimed and desired to be secured by Letters Patent of the United States is:

1. A low profile microminiature relay comprising
   a base plate containing at least one movable and at least one stationary contact member,
   first and second end plates supported by said base plate,
   each end plate having integral therewith a pole piece projecting into the space between said end plates,
   an armature,
   bearing means for rotatably supporting said armature for rotation between said end plates,
   first and second core members disposed between said end plates on either side of said pole pieces in a plane parallel with said base plate,
   a first coil wound on said first core and a second coil wound on said second core,
   means for energizing said first and second coils to supply magnetic flux to said end plates,
   said first and second end plates and their respective pole pieces completing a minimal reluctance magnetic path between each core and said armature so that flux from each core is combined in said armature,
   an actuator support separate from said armature,
   said actuator support being connected for rotation with said armature and having at least one actuator member projecting from the actuator support,
   said actuator member engaging said movable contact member to make contact with said stationary member upon rotation of said armature in response to energization of said coils.

2. A relay as recited in claim 1 including a spring member, said spring member having one end secured to fixed structure and the other end secured to said armature for normally biasing said armature out of engagement with said pole pieces, and further including a stop portion, said stop portion engaging said armature for limiting the spring biased rotation of said armature.

3. A relay as recited in claim 1 further including means for polarizing and releasably maintaining said armature in engagement with one of said pole pieces when the coils are not energized, wherein said armature is maintained on one side of said pole pieces, the axis of rotation of said armature being directed between said pole pieces so that said armature is rotated into engagement with one of said pole pieces when flux is passed through said pole pieces in a first direction in response to energization of said coils and said armature is rotated into engagement with the other of said pole pieces when flux is passed through said pole pieces in the opposite direction.

4. A relay as recited in claim 3 wherein said means for polarizing and releasably maintaining said armature in engagement with either of said pole pieces comprises a three pole magnet, the end portions of said magnet having a first polarity and the center portion of said magnet having a second polarity, the center portion of said magnet being positioned in magnetically conducting engagement with said armature and the end portions of said magnet being in magnetically conducting engagement with said pole pieces whereby said armature is magnetically retained in engagement with the pole piece said armature is contacting when the coils are not energized.

References Cited
UNITED STATES PATENTS

| | | | |
|---|---|---|---|
| 2,794,092 | 5/1957 | Bengtsson | 335—266 |
| 3,240,899 | 3/1966 | Rice | 335—125 |
| 3,253,095 | 5/1966 | Richert | 335—179 XR |

BERNARD A. GILHEANY, *Primary Examiner.*

R. N. ENVALL, JR., *Assistant Examiner.*